(12) United States Patent
Bhardwaj et al.

(10) Patent No.: US 12,066,892 B2
(45) Date of Patent: Aug. 20, 2024

(54) DATA RECOVERY BASED ON PARITY DATA IN A MEMORY SUB-SYSTEM

(71) Applicant: Micron Technology, Inc., Boise, ID (US)

(72) Inventors: Amit Bhardwaj, Hyderabad (IN); Naveen Bolisetty, Garidepally (IN); Suman Kumari, Bihar (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/184,395

(22) Filed: Mar. 15, 2023

(65) Prior Publication Data
US 2023/0214298 A1    Jul. 6, 2023

Related U.S. Application Data

(62) Division of application No. 16/834,534, filed on Mar. 30, 2020, now Pat. No. 11,630,725.

(60) Provisional application No. 62/953,329, filed on Dec. 24, 2019.

(51) Int. Cl.
| | | |
|---|---|---|
| G06F 11/10 | (2006.01) | |
| G06F 3/06 | (2006.01) | |
| G06F 9/30 | (2018.01) | |
| G06F 12/02 | (2006.01) | |
| G06F 12/0882 | (2016.01) | |

(52) U.S. Cl.
CPC ........ *G06F 11/1068* (2013.01); *G06F 3/0619* (2013.01); *G06F 3/065* (2013.01); *G06F 3/0679* (2013.01); *G06F 9/30029* (2013.01); *G06F 11/1076* (2013.01); *G06F 12/0246* (2013.01); *G06F 12/0882* (2013.01)

(58) Field of Classification Search
None
See application file for complete search history.

(56) References Cited

U.S. PATENT DOCUMENTS

| 5,594,862 A * | 1/1997 | Winkler .............. G06F 11/1076 |
| | | 714/801 |
| 6,298,415 B1 * | 10/2001 | Riedle ................. G06F 11/1076 |
| | | 711/143 |

(Continued)

FOREIGN PATENT DOCUMENTS

| CN | 106445724 A | 2/2017 |
| CN | 108062258 A | 5/2018 |

OTHER PUBLICATIONS

P. Subedi, P. Huang, X. He, M. Zhang and J. Han, "A hybrid erasure-coded ECC scheme to improve performance and reliability of solid state drives," 2014 IEEE 33rd International Performance Computing and Communications Conference (IPCCC), 2014, pp. 1-8, doi: 10.1109/PCCC.2014.7017095. (Year: 2014).

(Continued)

*Primary Examiner* — Daniel F. McMahon
(74) *Attorney, Agent, or Firm* — LOWENSTEIN SANDLER LLP

(57) ABSTRACT

An error associated with host data written to a page of a storage area of a memory sub-system is detected. A determination is made that parity data corresponding to the host data is stored in a cache memory of the memory sub-system. A data recovery operation is performed based on the parity data stored in the cache memory.

20 Claims, 6 Drawing Sheets

(56) References Cited

U.S. PATENT DOCUMENTS

| | | | | |
|---|---|---|---|---|
| 6,334,168 | B1* | 12/2001 | Islam | G06F 11/1076 |
| | | | | 711/111 |
| 6,460,122 | B1* | 10/2002 | Otterness | G06F 12/0866 |
| | | | | 711/E12.024 |
| 9,715,428 | B1* | 7/2017 | Morshed | G06F 11/08 |
| 2001/0056520 | A1* | 12/2001 | McBryde | G06F 11/1076 |
| | | | | 711/131 |
| 2006/0200697 | A1* | 9/2006 | Ito | G06F 3/0689 |
| | | | | 714/E11.034 |
| 2006/0206752 | A1* | 9/2006 | Ikeuchi | G06F 11/1076 |
| | | | | 714/E11.034 |
| 2013/0290777 | A1* | 10/2013 | Yoshihara | G06F 11/2089 |
| | | | | 714/15 |
| 2015/0154066 | A1* | 6/2015 | Grimsrud | G06F 11/108 |
| | | | | 714/764 |
| 2018/0074891 | A1 | 3/2018 | Yang et al. | |
| 2018/0089078 | A1 | 3/2018 | Ohno et al. | |
| 2019/0361771 | A1 | 11/2019 | Koltsidas et al. | |
| 2020/0218605 | A1* | 7/2020 | Subramanian | G06F 11/108 |
| 2020/0250090 | A1* | 8/2020 | Ware | G06F 12/0871 |
| 2021/0200637 | A1 | 7/2021 | Luo | |

OTHER PUBLICATIONS

Im S., et al., "Delayed Partial Parity Scheme for Reliable and High-performance Flash Memory SSD," 2010 IEEE 26th Symposium on Mass Storage Systems and Technologies (MSST), 2010, pp. 1-6, doi:10.1109/MSST.2010.5496997.
Office Action for Chinese Patent Application No. 202011551881.8, mailed Dec. 15, 2023, 11 Pages.

* cited by examiner

|  | Channel 0 | | | | Channel 1 | | | | Channel 2 | | | | Channel 3 | | | |
|---|---|---|---|---|---|---|---|---|---|---|---|---|---|---|---|---|
|  | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| PS 0 | Page 0 | Page 0 | Page 0 |  | Page 0 | Page 0 | Page 0 | Page 0 | Page 0 | Page 0 | Page 0 | Page 0 | Page 0 | Page 0 | Page 0 | Page 0 |
| PS 1 | Page 1 | Page 1 | Page 1 |  | Page 1 | Page 1 | Page 1 | Page 1 | Page 1 | Page 1 | Page 1 | Page 1 | Page 1 | Page 1 | Page 1 | Page 1 |
| PS 2 | Page 2 | Page 2 | Page 2 |  | Page 2 | Page 2 | Page 2 | Page 2 | Page 2 | Page 2 | Page 2 | Page 2 | Page 2 | Page 2 | Page 2 | Page 2 |
| PS 3 | Page 3 | Page 3 | Page 3 |  | Page 3 | Page 3 | Page 3 | Page 3 | Page 3 | Page 3 | Page 3 | Page 3 | Page 3 | Page 3 | Page 3 | Page 3 |
| PS 14 | R0 | R1 | R2 |  | R3 | R4 | R5 | R6 | R7 | R8 | R9 | R10 | R11 | R12 | R13 | XOR(R0-R13) |
| PS 15 | Page 14 | Page 14 | Page 14 |  | Page 14 | Page 14 | Page 14 | Page 14 | Page 14 | Page 14 | Page 14 | Page 14 | Page 14 | Page 14 | Page 14 | Page 14 |
| PS 16 | Page 15 | Page 15 | Page 15 |  | Page 15 | Page 15 | Page 15 | Page 15 | Page 15 | Page 15 | Page 15 | Page 15 | Page 15 | Page 15 | Page 15 | Page 15 |
| PS 17 | Page 16 | Page 16 | Page 16 |  | Page 16 | Page 16 | Page 16 | Page 16 | Page 16 | Page 16 | Page 16 | Page 16 | Page 16 | Page 16 | Page 16 | Page 16 |
| PS 30 | R15 | R16 | R17 |  | R19 | R20 | R21 | R22 | R23 | R24 | R25 | R26 | R27 | R28 | R29 | XOR(R15-R29) |
| PS N-2 |  |  |  |  |  |  |  |  |  |  |  |  |  |  |  |  |
| PS N-1 |  |  |  |  |  |  |  |  |  |  |  |  |  |  |  |  |
| PS N | Rn-14 | Rn-13 | Rn-12 |  | Rn-10 | Rn-9 | Rn-8 | Rn-7 | Rn-6 | Rn-5 | Rn-4 | Rn-3 | Rn-2 | Rn-1 | Rn-0 | XOR(Rn-14-Rn-0) |

← Plane 3 is a bad block

DATA RECOVERY BASED ON PARITY DATA IN A MEMORY SUB-SYSTEM

CROSS-REFERENCE TO RELATED APPLICATIONS

This application is a divisional of U.S. patent application Ser. No. 16/834,534, titled "Management of Parity Data in a Memory Sub-system," filed on Mar. 30, 2020, which in turn claims the benefit of U.S. Provisional Application No. 62/953,329, titled "Management of Parity Data in a Memory Sub-System," filed Dec. 24, 2019. The entire disclosures of U.S. patent application Ser. No. 16/834,534 and U.S. Provisional Application No. 62/953,329 are both incorporated herein by reference in their entireties.

TECHNICAL FIELD

Embodiments of the disclosure relate generally to memory sub-systems, and more specifically, relate to management of parity data in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates an example block stored in a storage area of a memory sub-system in connection with a parity data management process in accordance with some embodiments.

DETAILED DESCRIPTION

Figure 1:
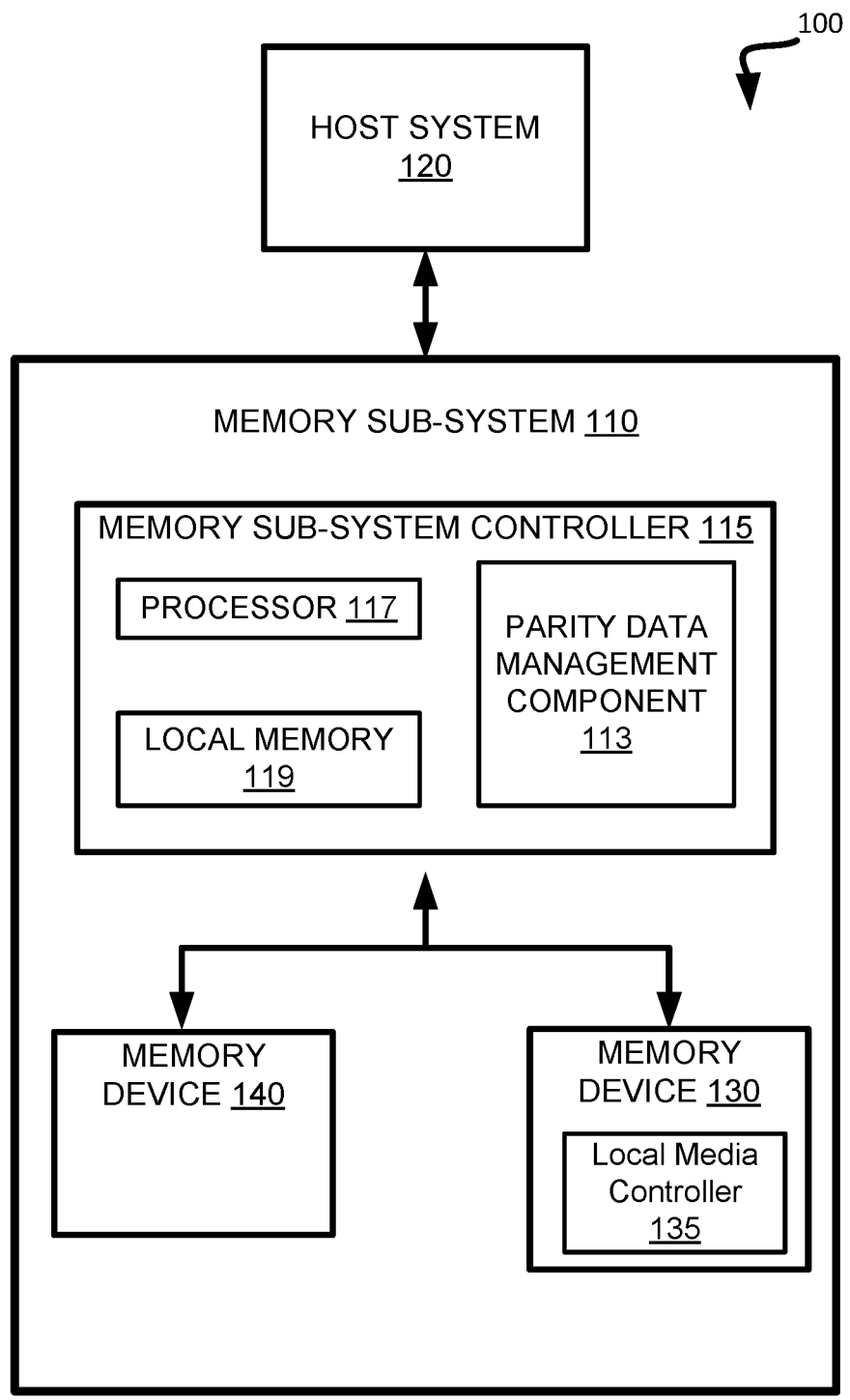
FIG. 1 illustrates an example computing system that includes a memory sub-system in accordance with some embodiments of the present disclosure.

Aspects of the present disclosure are directed to management of parity data in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory devices can include non-volatile memory devices that can store data from the host system. One example of non-volatile memory devices is a not-and (NAND) memory device. Other examples of non-volatile memory devices are described below in conjunction with FIG. 1. Various data operations can be performed on the memory cells of the memory devices on the memory sub-system. Data can be written to, read from, and erased from memory cells. Memory cells can be grouped into a write unit, such as a page. For some types of memory devices, a page is the smallest write unit. A page is a set of cells across the same word line. A page size represents a particular number of cells of a page. For some types of memory devices (e.g., NAND), memory cells can be grouped into an erase unit, such as a physical block, which is a group of pages. A physical block is a 2-dimensional memory array of pages (rows of cells) and strings (columns of cells). Data can be written to a block, page-by-page. Data can be erased at a block level. However, portions of a block cannot be erased. Multiple blocks can be grouped to form a plane. One or multiple planes can be grouped together to form a die of the memory device. A single die or multiple die stacked on top of each other can be grouped to form a package. The dice in the packages can be assigned to one or more channels for communicating with a memory sub-system controller.

A die is also hereinafter referred to as a logical unit (LUN). A LUN can contain one or more planes. A memory sub-system can use a striping scheme to treat various sets of data as units when performing data operations (e.g., write, read, erase). A LUN stripe is a collection of planes that are treated as one unit when writing, reading, or erasing data. Each plane in a LUN stripe can carry out the same operation, in parallel, of all of the other planes in the LUN stripe. A block stripe is a collection of blocks, one from each plane in a LUN stripe, that are treated as a unit. The blocks in a block stripe have the same block identifier (e.g., block number) in their respective planes. A page stripe is a set of pages having the same page identifier (e.g., the same page number), across a block stripe, and treated as a unit.

The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data.

As the host data is stored on the memory sub-system, the memory sub-system can implement a redundancy mechanism to protect the host data against a failure of a portion of a memory device that is storing the host data. For example, for a not-and (NAND) type flash memory device, the memory sub-system can implement a redundant array of independent NAND (RAIN) operation to provide redundancy for the data stored on the memory sub-system.

The memory sub-system can generate parity data when writing data received from the host system to the memory sub-system. The memory sub-system can generate the parity data based on an exclusive-or (XOR) operation with the received host data and use the parity data to reconstruct or recalculate the host data in the event of a failure of the portion of the memory device that is storing data from the host system. As an example, the memory sub-system can calculate parity data for a particular number of host data locations of a unit (e.g., a block) of the memory sub-system. The parity data can be generated based on an XOR operation among each of the host data stored on the on the particular number of host data locations. If a portion of a memory device storing one of the host data fails and the corresponding data is lost or corrupt, then the memory sub-system can reconstruct the lost/corrupt data based on an XOR operation among the rest of the host data and the parity data.

A memory sub-system can employ techniques to perform data recovery in the event of a memory defect associated with the programming of host data (e.g., data written by a host system) to a memory device of a memory sub-system. Conventionally, memory defects can be managed by a controller of the memory sub-system by writing parity data (e.g., exclusive or (XOR) parity data) in the memory device (e.g., flash memory such as NAND memory) along with the written host data. The generated parity data (e.g., the XOR parity data) is written by the controller to a portion of the physical memory device such that it is intermixed with the host data. For example, for a single page parity approach, the parity data is written to a last known available "good" block (e.g., a block storing host data that does not have errors or corrupted data in need of recovery) in a page stripe of the memory device. In a multi-page parity approach, the parity data is written to a last known available good page of a last page stripe (e.g., a set of pages of plane P3 of Channel 3 of a four die channel configuration).

A data recovery operation can be performed using the parity data to reconstruct the host data. Since the parity data is written to the memory sub-system such that it is intermixed with the host data, a sequential read operation, where contents of a page are read from contiguous logical addresses in sequence, can be negatively impacted. During a sequential read operation, multiple sequential type or bursts of access are performed using successive memory locations. That is, the subsequent memory location to be read and, therefore, its address is predictable from the address of the location being currently read. However, sequential read operations also result in the reading of the stored parity data which is not useful or meaningful data to be returned to the host system.

In addition, a location storing the parity data remains idle (e.g., not available to store the host data during a programming operation) since it is used to store the parity data instead of being used to store the host data, thereby negatively impacting the write performance of the memory sub-system. In this regard, in conventional systems, channel capacity is under-utilized for storing and reading host data.

Aspects of the present disclosure address the above and other deficiencies by having a memory sub-system that manages parity data to enable recovery of host data using parity data stored in a cache memory of a memory device. During a programming operation, a memory sub-system memory controller writes the host data to a full set of pages of a page stripe of the memory device (e.g., all of the pages of the page stripe). In addition, the memory controller writes a set of parity data (e.g., a set of XOR parity values generated based on the host data) to the cache memory. The parity data can be generated by executing an XOR operation using the host data written to a portion of the full page stripe of the memory device (e.g., based on the host data written to a portion including N–1 pages of a full page stripe having N pages). The memory sub-system controller can further generate an additional parity value and store the additional parity value in the cache memory. The additional parity value can be generated by performing an XOR operation on the set of XOR parity values (e.g., the previously aggregated set of parity values corresponding to the portion of the set of pages of the page stripe). Upon determining a page stripe of the cache memory (also referred to as a "source page stripe") is full (e.g., the source page stripe stores the set of parity data values and the additional parity value), the controller can move or write the parity data from the cache memory to the higher density storage area of the memory sub-system.

Advantageously, the host data can occupy a full page stripe of the memory device and, as a result, no bus idle period occurs during a sequential read operation. In addition, by storing the parity data in the cache memory instead of intermixing the parity data with the host data, the full channel capacity of the memory device can be used for data programming and transfer.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical block address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a parity data management component 113 that can be used to generate and store parity data in a cache memory of the memory sub-system 110 for use in a data recovery operation associated with data written by the host system 120. During a programming operation, the parity data management component 113 writes the host data to a full set of pages of a page stripe of the memory device (e.g., a memory device including multiple channels each having multiple planes (e.g., a four channel configuration (Channel 0-Channel 3) each having four planes (Plane 0-Plane 3)). The parity data management component 113 generates and writes a set of parity data to a portion of a page stripe of the cache memory. In an embodiment, the parity data management component 113 generates the set of parity data by executing an XOR operation using the host data to generate a set of XOR parity values.

For example, for a memory device having four die channels and N number of pages, the set of parity values can include N−1 XOR parity values stored in N−1 pages of a page stripe of the cache memory. In addition, the parity data management component 113 can generate an additional parity value (e.g., an Nth XOR parity value) by applying an XOR operation to an accumulation of the N−1 XOR parity values. In the example having a four channel, sixteen page configuration, the additional XOR parity value can be a sixteenth value which is based on the application of an XOR operation to the accumulated fifteen pages of XOR parity values). When the set of parity data and the additional parity data forms a full page stripe of the cache memory, the set of parity data and the additional parity data is moved or written to the memory device. Storing the parity data in the cache memory and enabling the full page stripe of the memory device to be used to store the host data achieves maximum sequential read performance, since no channel is idle during a sequential read operation involving the reading of multiple logical addresses in sequence.

In an embodiment, the parity data management component 113 can perform a data recovery operation using the parity data stored in the cache memory. In an embodiment, since the parity data is stored in the cache memory instead of the memory device, the parity data is not included in a data structure including mapping information associating logical addresses and physical addresses of the physical memory blocks of the memory sub-system (also referred to as an "L2P mapping data structure"). Since the parity data is not stored in the L2P mapping data structure, the parity data is not read as part of a sequential read operation. The parity data management component 113 determines that a portion of the memory cells of the destination block (e.g., all pages of a wordline) have been written during a garbage collection operation prior to erasing the written data from the source block of the cache memory. In so doing, the parity data management component 113 enables a data recovery process to be performed using the data of the preserved source block in the event of a power loss event occurring prior to fully programming the portion of the memory cell. In some embodiments, the memory sub-system controller 115 includes at least a portion of the parity data management component 113. For example, the memory sub-system controller 115 can include a processor 117 (processing device) configured to execute instructions stored in local memory 119 for performing the operations described herein. In some embodiments, the parity data management component 113 is part of the host system 120, an application, or an operating system. In the same or alternative embodiments, portions of the parity data management component 113 are part of the host system 120 while other portions of the parity data management component 113 are performed at the memory sub-system controller 115.

Figure 2:
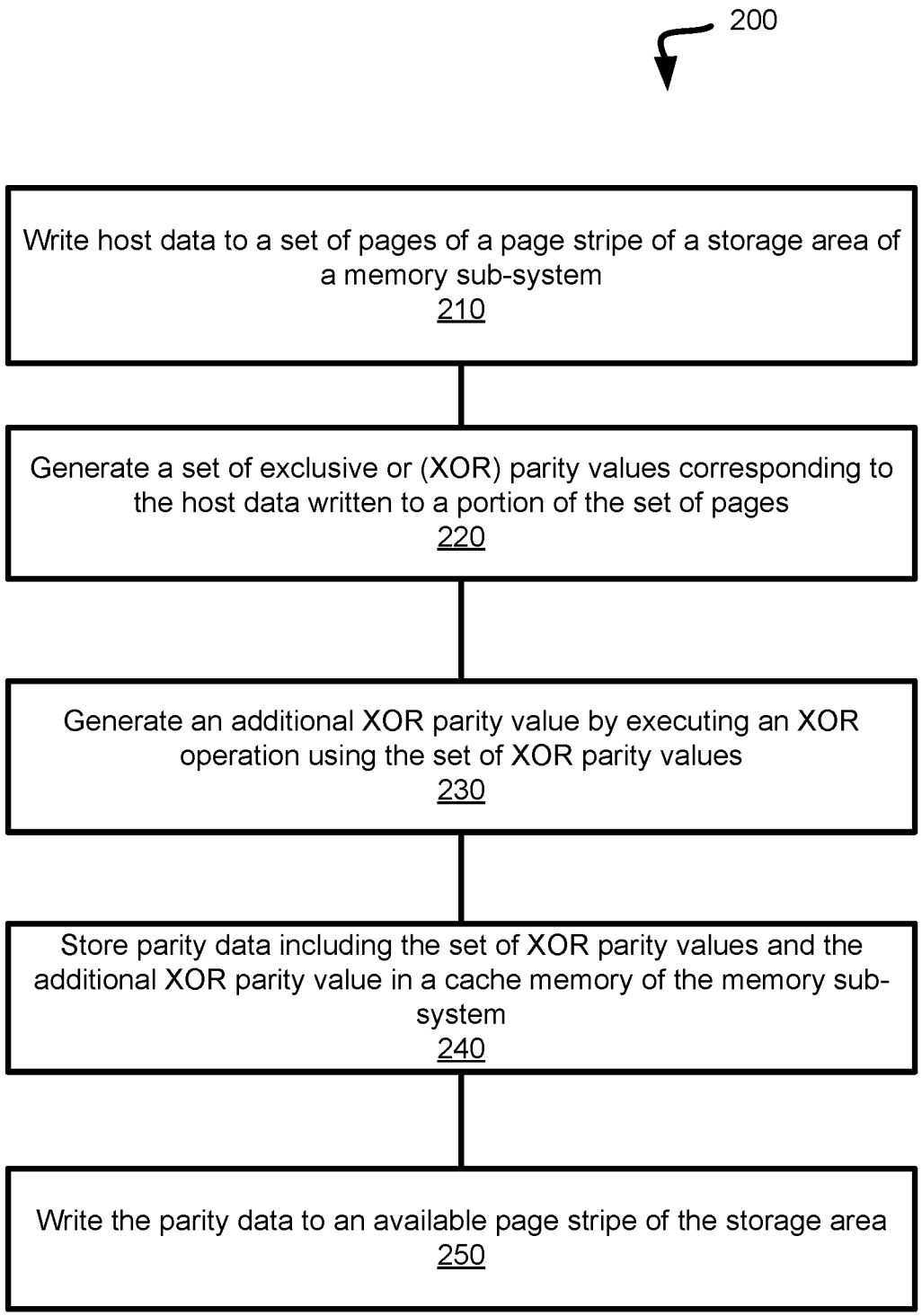
FIG. 2 is a flow diagram of an example method to manage parity data relating to host data written to a storage area of a memory sub-system in accordance with some embodiments.

FIG. 2 is a flow diagram of an example method 200 to manage parity data associated with host data written to a memory device of memory sub-system in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the parity data management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic writes host data to a set of pages of a page stripe of a storage area of a memory sub-system. In an embodiment, the storage area is a high density storage area, such as MLC, TLC, or XLC storage. In an embodiment, the host data is written in response to a request to write the data received from a host system. In an embodiment, the set of pages of the page stripe includes all of the pages of the page stripe (also referred to as a "full page stripe"). For example, for a four channel memory device having multiple page stripes (e.g., N number of page stripes) each including sixteen pages (Page 0/Plane 0/Channel 0 through Page 0/Plane 3/Channel 3), all sixteen pages of the memory device can be used to store the host data. Advantageously, by storing host data in each page of the full page stripe, no channels are idle during execution of a sequential read operation.

At operation 220, the processing logic generates a set of XOR parity values corresponding to the host data written to a portion of the set of pages of the page stripe. In an embodiment, the portion of the set of pages is N−1 pages for a page stripe including N pages. Using the host data in the portion of the set of pages (e.g., the first 15 pages of a page stripe having 16 pages), the set of XOR parity values are generated. For example, the set of XOR parity values can represents N−1 pages of parity data for a page stripe having N number of pages.

At operation 230, the processing logic generates an additional XOR parity value by executing an XOR operation using the set of XOR parity values. In an embodiment, the additional XOR parity value is calculated by applying an XOR operation to the set of XOR parity values generated in operation 220. For example, the additional XOR parity value is based on the accumulated N−1 XOR parity values (e.g., fifteen XOR parity values for a page stripe having sixteen (N) pages).

At operation 240, the processing logic stores parity data including the set of XOR parity values and the additional XOR parity value in a cache memory of the memory sub-system. In an embodiment, the XOR parity data values (e.g., the set of XOR parity values and the additional XOR parity value) are stored in a page stripe of the data cache. Advantageously, by writing the parity data values to the cache memory, and not in a page stripe of the memory device, sequential read operation performance is improved since the parity data is not read.

At operation 250, the processing logic writes the parity data to an available page stripe of the storage area. In an embodiment, upon determining that the page stripe of the cache memory (e.g., the source page stripe) is full (e.g., all pages of the page stripe storing the set of XOR parity data and the additional XOR parity data are full), the parity data is written to the high density storage area of the memory sub-system.

Figure 3:
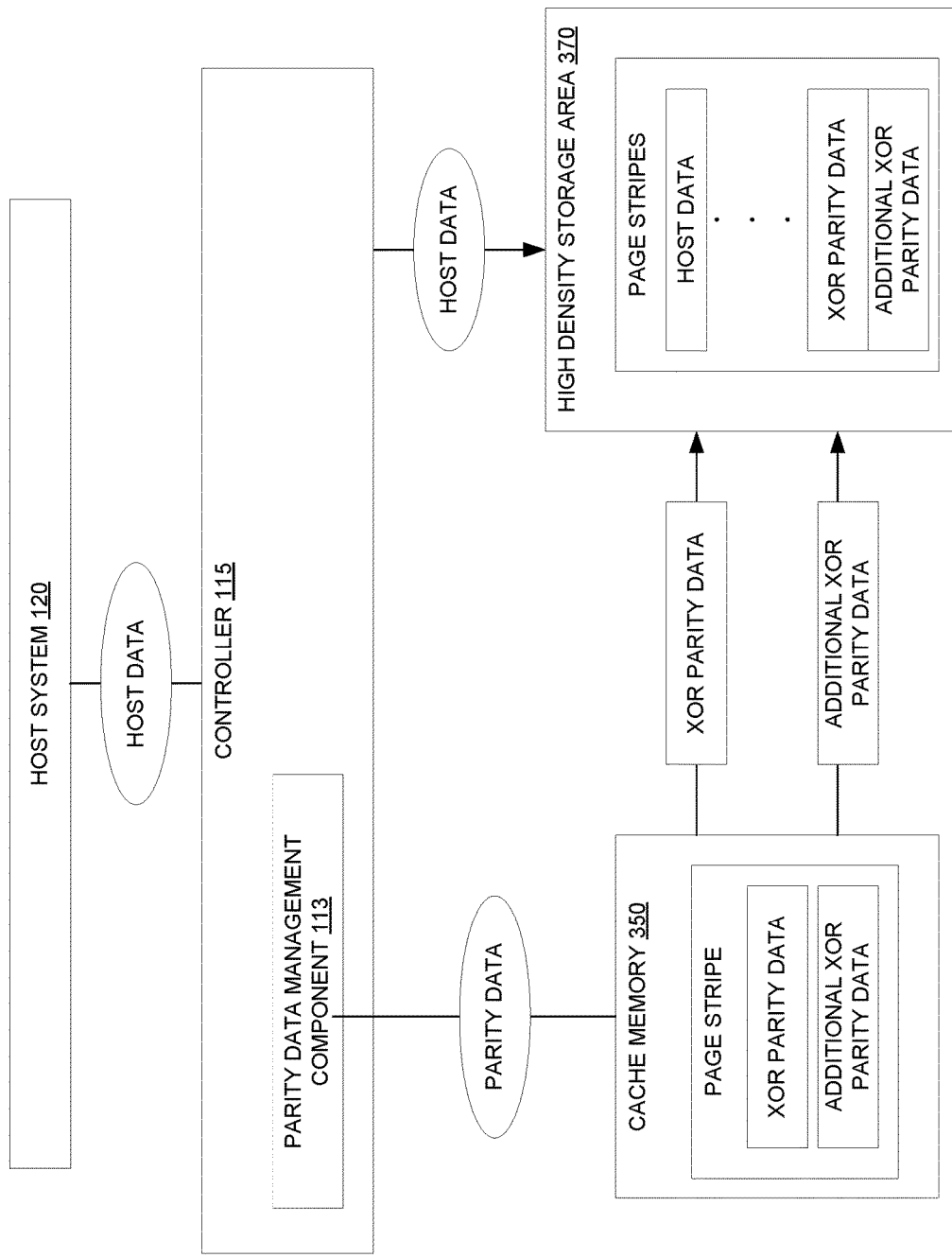
FIG. 3 illustrates an example environment including a controller having a parity data management component of a memory sub-system in accordance with some embodiments.

FIG. 3 illustrates an example system including a controller 115 operatively coupled to a host system 120. As shown, the controller 115 is configured to write the host data to a high density storage area (e.g., MLC, TLC, XLC storage). For example, the host data is stored in a first page stripe of the high density storage area 370. The controller 115 includes a parity data management component 113 configured to generate parity data based on the host data. In an embodiment, the parity data includes a first set of parity data generated by applying one or more operations (e.g., XOR operations) to the host data to generate XOR parity data. In an embodiment, the parity data management component 113 generates additional parity data based on the first set of parity data. In an embodiment, the additional parity data is generated by executing an XOR operation using the first set of XOR parity data. As shown, the XOR parity data and the additional XOR parity data is stored in a page stripe of the cache memory 350.

In an embodiment, upon determining that the page stripe of the cache memory 350 is full (e.g., the pages of the page stripe are filled with the XOR parity data and corresponding additional XOR parity data), the XOR parity data and the additional XOR parity are moved or written from the cache memory 350 to the page stripes of the high density storage area 370. The storage of the parity data in the cache memory 350 prior to writing to the high density storage area 370, sequential read operations corresponding to the host data written to the high density storage area 370 results in the avoidance of reading the parity data. Advantageously, sequential read is improved by avoiding idle channels having parity data in the high density storage area by storing the parity data in the cache memory 350 during the parity data generation process.

FIG. 4 illustrates an example block 400 (also referred to as a "meta block" or "superblock") of a high density storage area, according to embodiments. As shown, the block 400 represents a memory device having four channels (e.g., Channel 0, Channel 1, Channel 2, and Channel 3), four planes (e.g., Plane 0, Plane 1, Plane 2, and Plane 3) and N page stripes (e.g., PS 0, PS 1, PS 2 . . . PS N). For example, page stripe 0 (PS0) includes the host data written to page 0 across the multiple planes (Plane 0-Plane 3) of the multiple channels (Channel 0-Channel 3). As shown, page stripe 13 includes the first set of parity data (e.g., R0-R13) and corresponding additional parity data (e.g., XOR (R0-R13)) stored in a page corresponding to plane 3 of Channel 3, where R0 represents an XOR parity value corresponding to a portion of the host data). In the example shown in FIG. 4, page stripe 30 and page stripe N also store parity data written from a cache memory to block 400 of the high density storage area.

In an example shown in FIG. 4, plane 3 of Channel 0 of block 400 represents a bad block (e.g., a block including corrupted host data). Accordingly, as shown, each a page stripe includes fifteen good (e.g., non-corrupted) pages, instead of sixteen good pages. In this example, the first set of parity data includes fourteen XOR parity values corresponding to the first fourteen pages of the page stripe that include good host data. For example, page stripe 13 (PS 13) includes a first set of parity data including fourteen parity values (e.g., R0-R13). In this example, the additional parity data is calculated by applying an XOR operation using the parity data associated with the good pages (e.g., XOR (R0-R13)). In an embodiment, the additional parity value or count can be represented by the following expression: XOR parity count=A total number of good pages −1. The additional parity value can be stored in a next page stripe (e.g., PS 14) after writing the host data of a total number of good page equivalent page stripes (e.g., PS 0-PS 13) of the block 400. In an embodiment, the first set of parity value (e.g., R0-R13 of PS 14) and the additional parity value (e.g., XOR(R0-R13)) can be used in a data recovery process to recover at least a portion of the lost or corrupted data corresponding to plane 3 of Channel 0.

Figure 5:
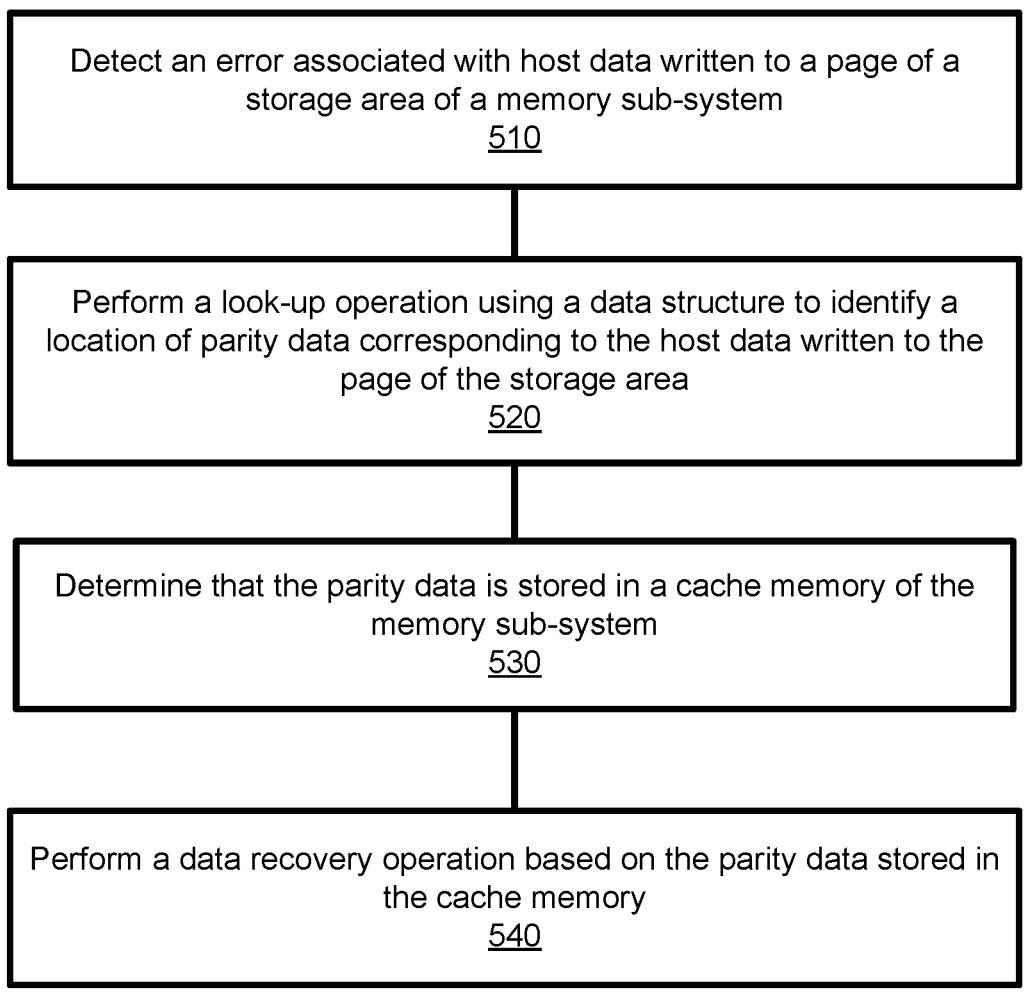
FIG. 5 is a flow diagram of an example method to perform data recovery operation using parity data stored in a cache memory of a memory sub-system in accordance with some embodiments.

FIG. 5 is a flow diagram of an example method 500 to perform a data recovery operation using parity data managed by a parity data management component manage in accordance with some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the parity data management component 113 of FIG. 1. In an embodiment, the operations of method 500 can be performed in connection with method 200 of FIG. 2. In an embodiment, the method 500 relates to the management of the parity data stored in a cache memory of a memory sub-system. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 5, at operation 510, the processing logic detects an error as associated with host data written to a page of a storage area of a memory sub-system. In an embodiment, the storage area is a high density storage area (e.g., MLC, TLC, XLC storage). In an embodiment, location or mapping information corresponding to an address of a destination block of the storage area corresponding to the host data is maintained (e.g., a channel identifier, plane identifier, and page identifier). In an embodiment, the location in the physical memory corresponding to the host data is maintained in a logical-to-physical (L2P) mapping data structure (e.g., an L2P table).

In operation 520, the processing logic performs a look-up operation using a data structure to identify a location of parity data corresponding to the host data written to the page of the storage area. In an embodiment, the location (e.g., an address) of the parity data corresponding to the bad or corrupt host data is stored in the data structure, such as an L2P mapping table. In an embodiment, the location of the parity data is an address in the cache memory or a high density storage area of the memory sub-system.

In operation 530, the processing logic determines that the parity data is stored in a cache memory of the memory sub-system. In an embodiment, the processing logic determines the corresponding parity data is stored in the cache memory by identifying an address of a block in the cache memory storing the parity data. In an embodiment, the parity data is stored in the cache memory as a result of operation 240 of method 200, as shown in FIG. 2. In an embodiment, the parity data can include a set of parity values generated by executing XOR operations using the host data. In an embodiment, the parity data can also include additional parity value generated by executing an XOR operation using the set of parity value. In an embodiment, the processing logic can, alternatively, determine the parity data is stored in the high density storage area (e.g., as a result of operation 250 of method 200 of FIG. 2).

In operation 540, the processing logic performs a data recovery operation based on the parity data stored in the cache memory. In an embodiment, the data recovery operation is applied to the parity value to recover or reconstruction the host data that included the errors (e.g., the one or more bad blocks) as a result of a failure. Advantageously, storing the parity data in the cache memory until a complete page stripe is ready to be moved to the high density storage area enables a sequential read operation to be executed without having one or more idle channels being used to store parity data. In addition, by storing the parity data in the cache memory, a sequential read operation also reads the host data and not the intermediate or in-process parity data.

Figure 6:
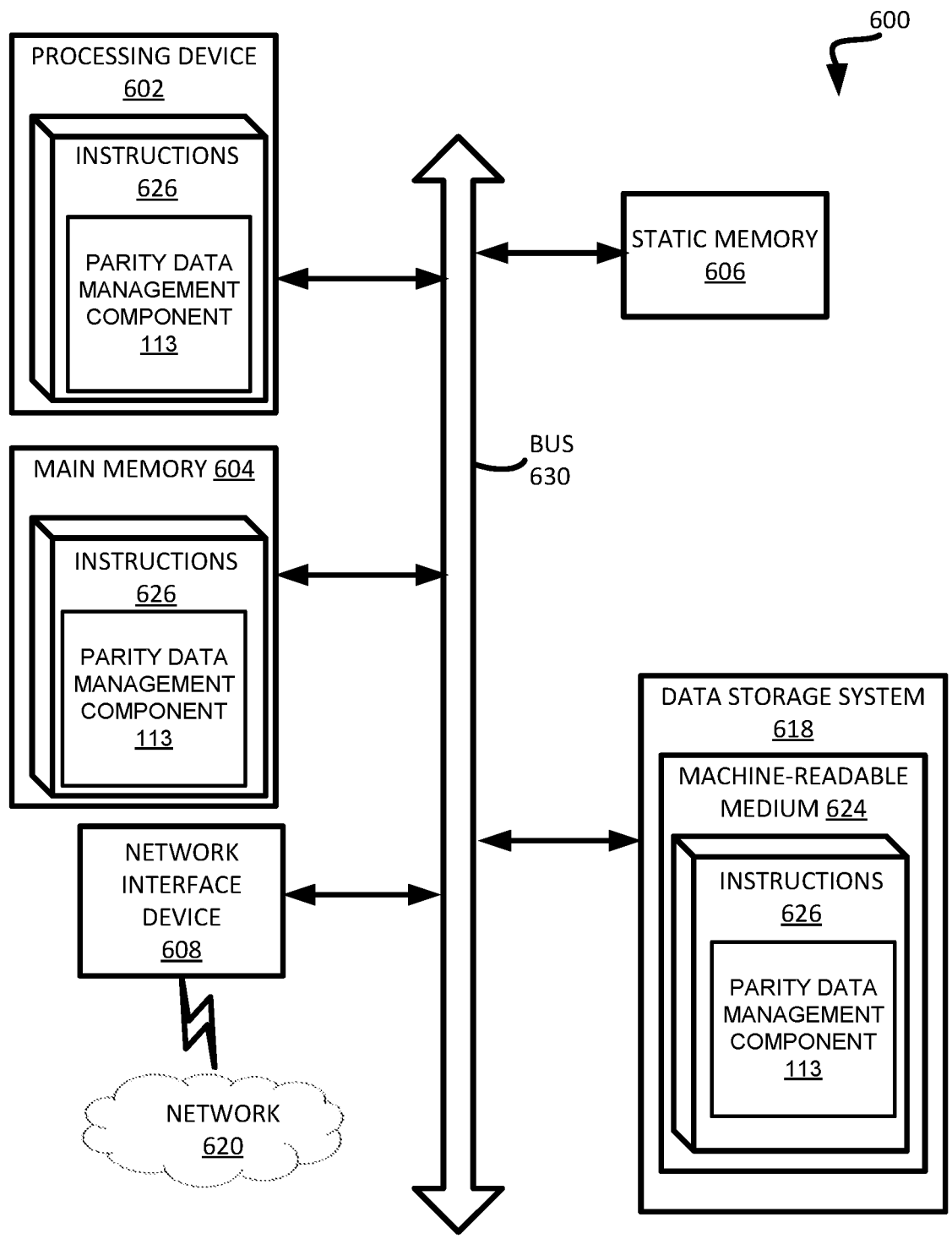
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a parity data management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a data protection component (e.g., the parity data management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
generating parity data corresponding to host data written to a page of a storage area of a memory sub-system;
detecting an error associated with the host data written to the page of the storage area of the memory sub-system;
determining that the parity data corresponding to the host data is stored in a cache memory of the memory sub-system; and
performing, by a processing device, a data recovery operation based on the parity data stored in the cache memory.

2. The method of claim 1, further comprising performing a look-up operation using a data structure to identify a location of the cache memory storing the parity data corresponding to the host data written to the storage area of the memory sub-system.

3. The method of claim 1, wherein the parity data comprises a set of exclusive-or (XOR) parity values corresponding to the host data written to the page of the storage area of the memory sub-system.

4. The method of claim 3, further comprising storing the parity data in the cache memory of the memory sub-system, wherein the parity data comprises the set of XOR parity values and an additional XOR parity value corresponding to the set of XOR parity values.

5. The method of claim 4, further comprising determining a first portion of the cache memory storing the parity data is full.

6. The method of claim 5, further comprising writing the parity data to an available page stripe of the storage area.

7. The method of claim 6, further comprising, prior to the writing of the parity data to the available page stripe of the storage area, executing a sequential read operation to read at least a portion of the host data from the storage area.

8. A non-transitory computer readable medium comprising instructions, which when executed by a processing device, cause the processing device to perform operations comprising:
generating parity data corresponding to host data written to a page of a storage area of a memory sub-system;
detecting an error associated with the host data written to the page of the storage area of the memory sub-system;
determining that the parity data corresponding to the host data is stored in a cache memory of the memory sub-system; and
performing a data recovery operation based on the parity data stored in the cache memory.

9. The non-transitory computer readable medium of claim 8, the operations further comprising:
performing a look-up operation using a data structure to identify a location of the cache memory storing the parity data corresponding to the host data written to the storage area of the memory sub-system.

10. The non-transitory computer readable medium of claim 8, wherein the parity data comprises a set of XOR parity values corresponding to the host data written to the page of the storage area of the memory sub-system.

11. The non-transitory computer readable medium of claim 10, the operations further comprising:
storing the parity data in the cache memory of the memory sub-system, wherein the parity data comprises the set of XOR parity values and an additional XOR parity value corresponding to the set of XOR parity values.

12. The non-transitory computer readable medium of claim 11, the operations further comprising:
    determining a first portion of the cache memory storing the parity data is full.

13. The non-transitory computer readable medium of claim 12, the operations further comprising writing the parity data to an available page stripe of the storage area.

14. The non-transitory computer readable medium of claim 13, the operations further comprising, prior to the writing of the parity data to the available page stripe of the storage area, executing a sequential read operation to read at least a portion of the host data from the storage area.

15. A system comprising:
    a memory device; and
    a processing device, operatively coupled with the memory device, to perform operations comprising:
        generating parity data corresponding to host data written to a page of a storage area of a memory sub-system;
        detecting an error associated with the host data written to the page of the storage area of the memory sub-system;
        determining that the parity data corresponding to the host data is stored in a cache memory of the memory sub-system; and
        performing a data recovery operation based on the parity data stored in the cache memory.

16. The system of claim 15, the operations further comprising:
    performing a look-up operation using a data structure to identify a location of the cache memory storing the parity data corresponding to the host data written to the storage area of the memory device.

17. The system of claim 15, wherein the parity data comprises a set of XOR parity values corresponding to the host data written to the page of the storage area of the memory device.

18. The system of claim 17, the operations further comprising:
    storing the parity data in the cache memory of the memory device, wherein the parity data comprises the set of XOR parity values and an additional XOR parity value corresponding to the set of XOR parity values.

19. The system of claim 18, the operations further comprising:
    determining a first portion of the cache memory storing the parity data is full; and
    writing the parity data to an available page stripe of the storage area.

20. The system of claim 19, the operations further comprising, prior to the writing of the parity data to the available page stripe of the storage area, executing a sequential read operation to read at least a portion of the host data from the storage area.

* * * * *